US012045183B2

United States Patent
Ito et al.

(10) Patent No.: US 12,045,183 B2
(45) Date of Patent: Jul. 23, 2024

(54) DISTRIBUTED PROCESSING NODE AND DISTRIBUTED PROCESSING SYSTEM

(71) Applicant: Nippon Telegraph and Telephone Corporation, Tokyo (JP)

(72) Inventors: Tsuyoshi Ito, Tokyo (JP); Kenji Tanaka, Tokyo (JP); Yuki Arikawa, Tokyo (JP); Kazuhiko Terada, Tokyo (JP); Takeshi Sakamoto, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/915,658

(22) PCT Filed: Apr. 2, 2020

(86) PCT No.: PCT/JP2020/015157
§ 371 (c)(1),
(2) Date: Sep. 29, 2022

(87) PCT Pub. No.: WO2021/199396
PCT Pub. Date: Oct. 7, 2021

(65) Prior Publication Data
US 2023/0124193 A1    Apr. 20, 2023

(51) Int. Cl.
*G06F 1/00* (2006.01)
*G06F 9/50* (2006.01)
*G06F 13/28* (2006.01)
*G06N 3/098* (2023.01)

(52) U.S. Cl.
CPC ............ *G06F 13/28* (2013.01); *G06F 9/5033* (2013.01); *G06N 3/098* (2023.01)

(58) Field of Classification Search
CPC ........ G06F 13/28; G06F 9/5033; G06N 3/098
See application file for complete search history.

(56) References Cited

U.S. PATENT DOCUMENTS

| 11,099,902 | B1* | 8/2021 | Matthews | G06F 9/5027 |
| 2019/0188563 | A1* | 6/2019 | Toda | G06N 3/063 |
| 2020/0174840 | A1* | 6/2020 | Zhao | G06F 9/5011 |

OTHER PUBLICATIONS

Luehr, N., "Fast Multi-GPU collectives with NCCL," NVIDIA Corporation, Apr. 7, 2016, 5 pages.
Mellanox Technologies, "Mellanox OFED GPUDirect RDMA," Software Product Brief, 2018, 2 pages.

* cited by examiner

*Primary Examiner* — Henry Tsai
*Assistant Examiner* — Kim T Huynh
(74) *Attorney, Agent, or Firm* — Slater Matsil, LLP

(57) ABSTRACT

A distributed processing node includes a computing device that calculates gradient data of a loss function from an output result obtained by inputting learning data to a learning target model, an interconnect device that aggregates gradient data between the distributed processing node and other distributed processing nodes, a computing function unit that is provided in a bus device and performs processing of gradient data from the computing device, and a DMA controller that controls DMA transfer of gradient data between the computing device and the bus device and DMA transfer of gradient data between the bus device and the interconnect device.

11 Claims, 10 Drawing Sheets

DISTRIBUTED PROCESSING NODE AND DISTRIBUTED PROCESSING SYSTEM

CROSS-REFERENCE TO RELATED APPLICATIONS

This patent application is a national phase filing under section 371 of PCT application no. PCT/JP2020/015157, filed on Apr. 2, 2020, which is incorporated herein by reference in its entirety.

TECHNICAL FIELD

The present invention relates to a distributed processing system that executes deep learning or the like in a plurality of distributed processing nodes in a distributed cooperated manner and relates to a distributed processing node and a distributed processing system capable of processing group communication among a plurality of computing devices efficiently and at high speed and low latency to process information processing at high speed and high efficiency.

BACKGROUND

In recent years, it has been said that a so-called post-Moore era is arriving when Moore's law cannot be applied because of the limit of refining of a silicon process. Toward this post-Moore era, efforts have been made to break through a computing performance limit related to the silicon process refining of computing devices such as a CPU (Central Processing Unit) and remarkably improve the computing performance of such devices.

As such efforts, there is an approach of multicoring for providing a plurality of computing cores in one processor. However, multicoring has a limit in remarkable performance improvement of processors themselves because of a limit in the size of each silicon chip. Therefore, in order to exceed the limit of processors themselves, attention is being paid to a distributed processing system technique for processing a high-load task, which is difficult for a single device or a single server, at high speed by using a distributed processing system in which a plurality of servers mounted with computing devices are connected by a large-capacity interconnect.

For example, in deep learning, which is an example of a high-load job, for a learning target consisting of multilayer neuron models, inference accuracy is improved by updating the weight of each neuron model (a coefficient by which a value output by a neuron model in the preceding stage is to be multiplied) using an input of a large amount of sample data.

Usually, a minibatch method is used as a method of improving inference accuracy. In the minibatch method, repetition is made for the following: gradient calculation processing for calculating gradients with respect to weights for each of sample data; aggregation processing for aggregating gradients for a plurality of different sample data (totaling, for each of weights, the gradients obtained for each of the sample data); and weight update processing for updating the weights based on the aggregated gradient.

Distributed deep learning using the distributed processing system technology needs, in order to perform the aggregation processing, integrated communication from distributed processing nodes to an aggregation processing node for integrating distributed data obtained for each of distributed processing nodes into an aggregation processing node, all-node aggregation processing in the aggregation processing node, and distributed communication from the aggregation processing node to the distributed processing nodes for transferring data aggregated by the aggregation processing node to the distributed processing nodes.

Processing necessary for the distributed deep learning, in particular, group communication such as the integrated communication and the distributed communication, needs many times of communication. However, if the number of weights and the number of sample data to be input are increased in order to improve inference accuracy of deep learning, a communication time increases and a time required for the deep learning increases. Accordingly, in order to improve the inference accuracy and not to increase the time required for the deep learning, an acceleration technique for mounting a plurality of computing devices in distributed processing nodes at high density and improving the processing performance of the distributed processing nodes themselves is used.

FIG. 10 is a block diagram showing an example of a conventional distributed processing system using the acceleration technique. The distributed processing nodes 500-1 to 500-4 are connected to each other by a transmission line 504. The distributed processing nodes 500-1 to 500-4 respectively include a plurality of computing devices 501, an interconnect device 502 consisting of an FPGA (Field Programmable Gate Array), and general-purpose buses 503 that connect the computing devices 501 and the interconnect device 502.

As shown in FIG. 10, when it is attempted to improve the processing performance of the distributed processing nodes 500-1 to 500-4 by mounting the plurality of computing devices 501 each in the distributed processing nodes 500-1 to 500-4, computing in integrated communication is performed by, for example, hardware of the interconnect device 502 including interconnect ports.

Thereafter, among the distributed processing nodes 500-1 to 500-4 connected by the transmission line 504, computing in group communication is performed by the hardware of the interconnect device 502 each mounted on the distributed processing nodes 500-1 to 500-4. Consequently, it is possible to perform the computing in the group communication at high speed and realize an increase in speed of distributed processing as in the nodes.

However, when the plurality of computing devices 501 are mounted each in the distributed processing nodes 500-1 to 500-4, computing results are simultaneously sent from the computing devices 501 to the interconnect device 502 through the general-purpose buses 503 in each node. Accordingly, a problem occurs in that congestion due to collision of data from the plurality of computing devices 501 occurs on an input side of the interconnect device 502 and the congestion becomes a communication bottleneck and deteriorates computing performance.

As a technique for efficiently performing group communication in nodes, an NCCL (NVIDIA Collective Communications Library) has been proposed (see Non-Patent Literature 1). However, in the NCCL, since computing is performed in such a manner as to go around a plurality of computing devices, there is a problem in that there is variation in processing times of the group communication performed in the computing devices and thus a processing ability is deteriorated.

There has been proposed a technique for increasing processing speed by making data movement in nodes and data movement among the nodes efficient by direct memory access (DMA) transfer via a general-purpose bus between a computing device and an interconnect device (see Non- Patent Literature 2). However, in the technique disclosed in Non-Patent Literature 2, congestion at the time when communication from a plurality of computing devices concentrates on the interconnect device cannot be avoided. Accordingly, significant improvement of processing efficiency is difficult.

As a similar technique for avoiding such congestion, a technique called SHARP (Scalable Hierarchical Aggregation and Reduction Protocol)® has been proposed (see Patent Literature 1). When the technique disclosed in Patent Literature 1 is applied to a distributed processing system, congestion in group communication among nodes can be avoided by setting a switch device among distributed processing nodes. However, a problem of processing deterioration due to congestion in the nodes remains.

CITATION LIST

Patent Literature

Patent Literature 1: U.S. patent Ser. No. 10/284,383.

Non-Patent Literature

Non-Patent Literature 1: Nathan Luehr, NVIDIA Corporation, "Fast Multi-GPU collectives with NCCL", 2016, <https://devblogs.nvidia.com/fast-multi-gpu-collectives-nccl/>.

Non-Patent Literature 2: Mellanox Technologies Ltd., "Mellanox OFED GPUDirect RDMA", 2018, <https://www.mellanox.com/related-docs/prod_software/PB_GPU-Direct_RDMA.PDF>.

SUMMARY

Technical Problem

Embodiments of the present invention have been devised considering the circumstances described above, and an object of embodiments of the present invention is to, in a distributed processing system in which distributed processing nodes each mounted with a plurality of computing devices are connected by interconnect devices, eliminate communication congestion in the distributed processing nodes and equalize a communication bottleneck due to congestion and computing processing of group communication to provide the distributed processing nodes and the distributed processing system having high efficiency.

Means for Solving the Problem

A distributed processing node of embodiments of the present invention includes: a plurality of computing devices configured to calculate gradient data of a loss function from an output result obtained by inputting learning data to a learning target model and update parameters of the model based on aggregation data of the gradient data; an interconnect device configured to aggregate the gradient data between the distributed processing node and other distributed processing nodes; a computing function unit provided in a bus device connected to the plurality of computing devices and the interconnect device, the computing function unit being configured to perform at least one of processing of gradient data from the plurality of computing devices and processing of gradient data from the interconnect device; a DMA controller configured to control DMA transfer of gradient data between the plurality of computing devices and the bus device and DMA transfer of gradient data between the bus device and the interconnect device; and a control unit configured to allocate a learning job requested from an outside to at least one of the plurality of computing devices.

In one configuration example of the distributed processing node of embodiments of the present invention, the computing function unit is provided for each learning job.

One configuration example of the distributed processing node of embodiments of the present invention further includes a sorting unit configured to acquire, from the DMA controller, information concerning the DMA transfer from the plurality of computing devices to the bus device and sort gradient data calculated by the computing devices in response to a request for the learning job and transferred to the bus device to the computing function unit corresponding to the learning job based on the information acquired from the DMA controller.

One configuration example of the distributed processing node of embodiments of the present invention further includes a scheduler unit configured to acquire, from the DMA controller, information concerning DMA transfer from the plurality of computing devices to the bus device and determine, based on the acquired information, order and timing of DMA transfer from the computing function unit in the bus device to the interconnect device.

In one configuration example of the distributed processing node of embodiments of the present invention, a frequency of a clock signal supplied to the computing function unit is higher than a frequency of a clock signal supplied to the interconnect device, and operation speed of the computing function unit is higher than operation speed of the interconnect device.

A distributed processing system of embodiments of the present invention includes a plurality of distributed processing nodes and includes a control node configured to control the plurality of distributed processing nodes. The control node includes: a job receiving unit configured to receive request information of a learning job from an outside; a management database unit configured to manage resource information of each of the distributed processing nodes; and a control instructing unit configured to create, based on the request information from the job receiving unit and the resource information managed by the management database unit, for each of the distributed processing nodes, control instruction information including information concerning a computing device to which the learning job is allocated. A control unit of each of the distributed processing nodes allocates the learning job to a computing device of the own node instructed by the control instruction information and causes the computing device to start the learning job.

In one configuration example of the distributed processing system of embodiments of the present invention, each of the distributed processing nodes further includes a parameter storing unit configured to store parameters of the model, the management database unit of the control node manages resource information of each of the distributed processing nodes and information concerning the model, the control instructing unit of the control node creates, besides the information concerning the computing device to which the learning job is allocated, the control instruction information including information concerning a learning target model and information concerning parameters, and a control unit of each of the distributed processing nodes reads out the parameters of the learning target model from the parameter storing unit of the own node according to the control instruction information.

Effects of Embodiments of the Invention

In embodiments of the present invention, in a large-scale distributed processing system that performs a large amount of information processing, when causing the distributed processing system to process one large learning job at high speed or causing the distributed processing system to process a plurality of learning jobs at high speed and high efficiency, a bus device that performs computing processing of group communication or the like is provided in a general-purpose bus route between a plurality of computing devices and an interconnect device and a computing function unit is provided in the bus device, and the computing function unit is caused to perform processing of gradient data. Therefore, in embodiments of the present invention, even if the processed gradient data is transferred to the interconnect device, congestion in the interconnect device does not occur and a waiting time due to the congestion does not occur. Therefore, it is possible to perform information processing of a learning job or the like at high speed and high efficiency.

DETAILED DESCRIPTION OF ILLUSTRATIVE EMBODIMENTS

First Embodiment

Figure 1:
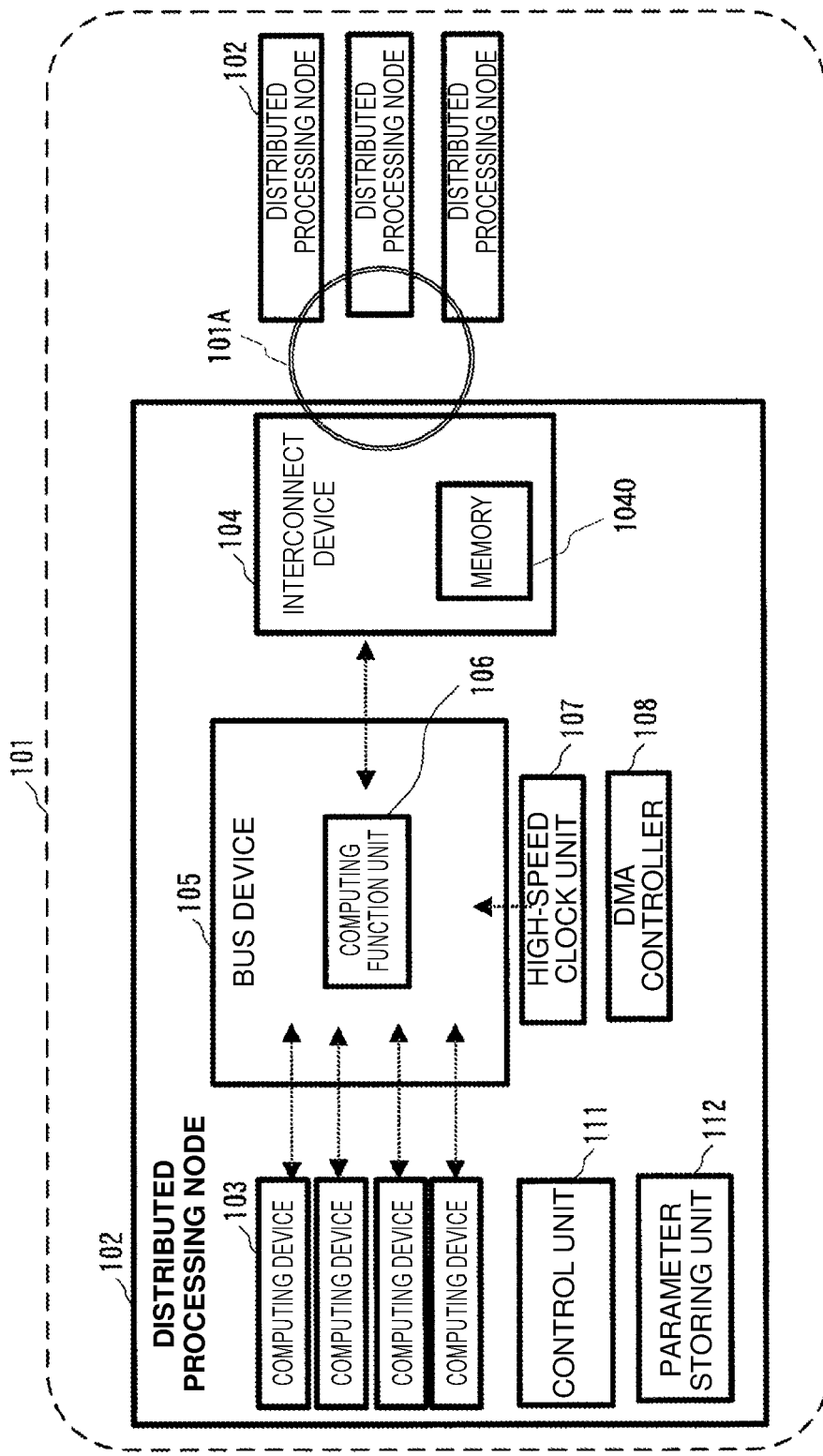
FIG. 1 is a block diagram showing the configuration of a distributed processing system according to a first embodiment of the present invention.

Embodiments of the present invention are explained below with reference to the drawings. FIG. 1 is a block diagram showing the configuration of a distributed processing system according to a first embodiment of the present invention. A distributed processing system 101 is configured from a plurality of distributed processing nodes 102 and a transmission line 101A connecting the plurality of distributed processing nodes 102.

Each of the distributed processing nodes 102 includes a plurality of computing devices 103 each including a GPU (Graphics Processing Unit) or the like, an interconnect device 104 including an FPGA including a data communication function via a transmission line and an optical transceiver, a bus device 105 including an FPGA including a function of performing data communication with the computing devices 103 through a general-purpose bus such as PCI-Express and a computing function, and a computing function unit 106 that is provided in the bus device 105 and processes data from the computing devices 103 and the interconnect device 104.

Each of the distributed processing nodes 102 includes a high-speed clock unit 107 that supplies a high-speed clock signal to the computing function unit 106 of the bus device 105, a DMA controller 108 that controls DMA transfer of data between the computing devices 103 and the bus device 105 and DMA transfer of data between the bus device 105 and the interconnect device 104, a control unit iii that allocates a learning job requested from the outside to at least one of the plurality of computing devices 103, and a parameter storing unit 112 that stores parameters of a model.

More specifically, for example, as the distributed processing node 102, a SYS-4028GR-TR2 server manufactured by Super Micro Computer, Inc. (hereinafter simply referred to as a server) is used. On a CPU motherboard of the server, two Xeon® processors E5-2600V4 manufactured by Intel Corporation are mounted as a CPU and eight DDR4-2400 DIMM (Dual Inline Memory Module) 32 GB memory cards are mounted as main memories.

A PCI-Express 3.0 (Gen3) 16-lane slot daughter board is mounted on the CPU motherboard. On a slot of the daughter board, four V100 CPUs, which are CPUs manufactured by NVIDIA Corporation, are mounted as the computing devices 103 and one VCU118 Evaluation board manufactured by Xilinx, Inc. is mounted as the interconnect device 104. Further, two QSFP28 optical transceivers are mounted on the Evaluation board. The distributed processing nodes 102 are connected in a ring shape by the transmission line 101A including an optical fiber.

A PCIe route complex device is mounted on the motherboard of the server as a bus device. However, computing functions for addition processing and the like necessary for group communication among computing devices are not mounted on the PCIe route complex device. Therefore, in this embodiment, a device obtained by imparting the function of the computing function unit 106 to the PCIe route complex device is used as the bus device 105.

In the server, usually, a 100 MHz clock signal is supplied to the PCIe route complex device. In this embodiment, by providing the high-speed clock unit 107 anew, a 500 MHz clock signal is supplied from the high-speed clock unit 107 to the computing function unit 106 of the bus device 105.

As the DMA controller 108 mounted on the motherboard, a DMA controller changed to operate via the bus device 105 as well is mounted. Note that, in FIG. 1, the DMA controller 108 is disposed on the outside of the interconnect device 104. However, the DMA controller 108 may be provided on the inside of the FPGA configuring the interconnect device 104.

A 480 GB capacity SSD (Solid State Drive) is mounted on the server as a storage medium for installing an OS (Operating System). A Ubuntu18.04 LTE is used as the OS. A computing framework explained below is incorporated in the OS.

The operation in this embodiment is explained in comparison with the operation of the conventional art using the distributed processing system 101 shown in FIG. 1. In the following explanation, as an example, distributed deep learning of an AI (Artificial Intelligence) for classifying images accumulated in imagenet (http://www.imagenet.org/), which is an image database, is performed using Resnet50, which is one learning model. Note that a deep learning platform of a Tensor Flow base is used.

In embodiments of the present invention, a job executed in deep learning is referred to as a learning job. In some cases, different learning jobs may be possible for the same user.

The control unit in is configured from, for example, a CPU. The control unit 111 includes a function of constructing a mathematical model in a software manner according to software such as the deep learning platform of the Tensor Flow base, a function of reading out parameters (weight and the like) of a learning target model from the parameter storing unit 112, a function of writing parameters of a model in the parameter storing unit 112, a function of securing a resource, that is, a free computing device and allocating a learning job to the computing device 103, and a function of reading out learning data such as image data from the outside and passing the learning data to the computing device 103.

The interconnect device 104 aggregates data between the distributed processing node 102 and the other distributed processing nodes 102.

Figure 2:
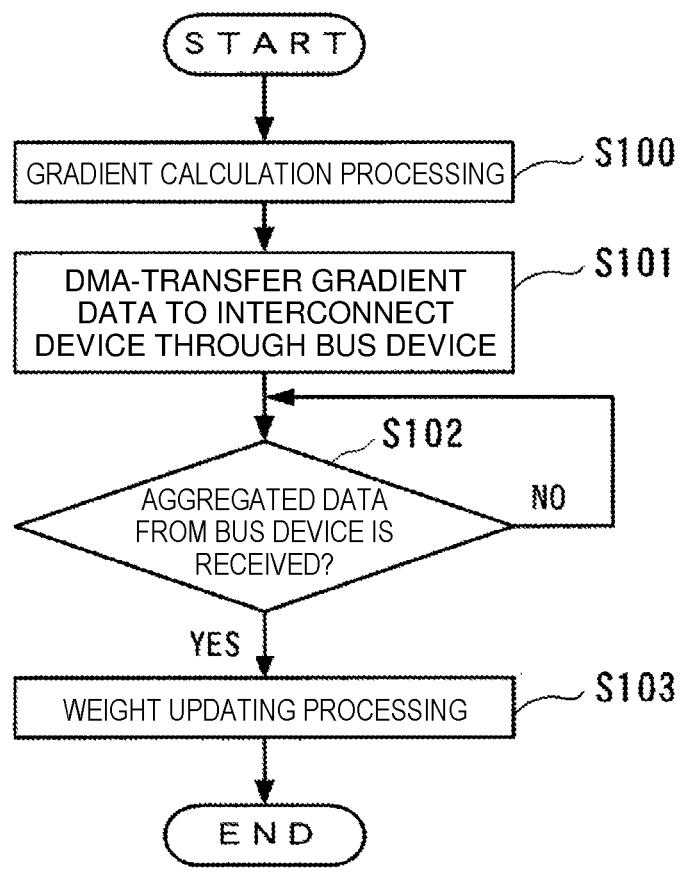
FIG. 2 is a flowchart for explaining the operations of computing devices and a DMA controller of a distributed processing node according to the first embodiment of the present invention.

FIG. 2 is a flowchart for explaining the operations of the distributed processing node 102 and the DMA controller 108.

Each of the computing devices 103 of the distributed node 102 receives image data of the imagenet via the control unit 111. Each of the computing devices 103 calculates a gradient of a loss function of a model for each of a plurality of weights of a learning target model (a neural network of Resnet50) in the own node and generates, for each of the weights, gradient data obtained by aggregating the gradients for each of image data (step S100 in FIG. 2).

Since the weight of the model, the loss function, which is an indicator indicating poor performance of the model, and the gradient of the loss function are well-known techniques, detailed explanation thereof is omitted. In this embodiment, for example, gradient calculation processing, which is one task of a learning job, is performed for 32 minibatch sizes.

After an end of the gradient calculation processing in each of the computing devices 103, the DMA controller 108 DMA-transfers the gradient data calculated by each of the computing devices 103 to a memory 1040 in the interconnect device 104 through the computing function unit 106 of the bus device 105 of the own node (step S100 in FIG. 2). The DMA transfer is explained below.

Figure 3:
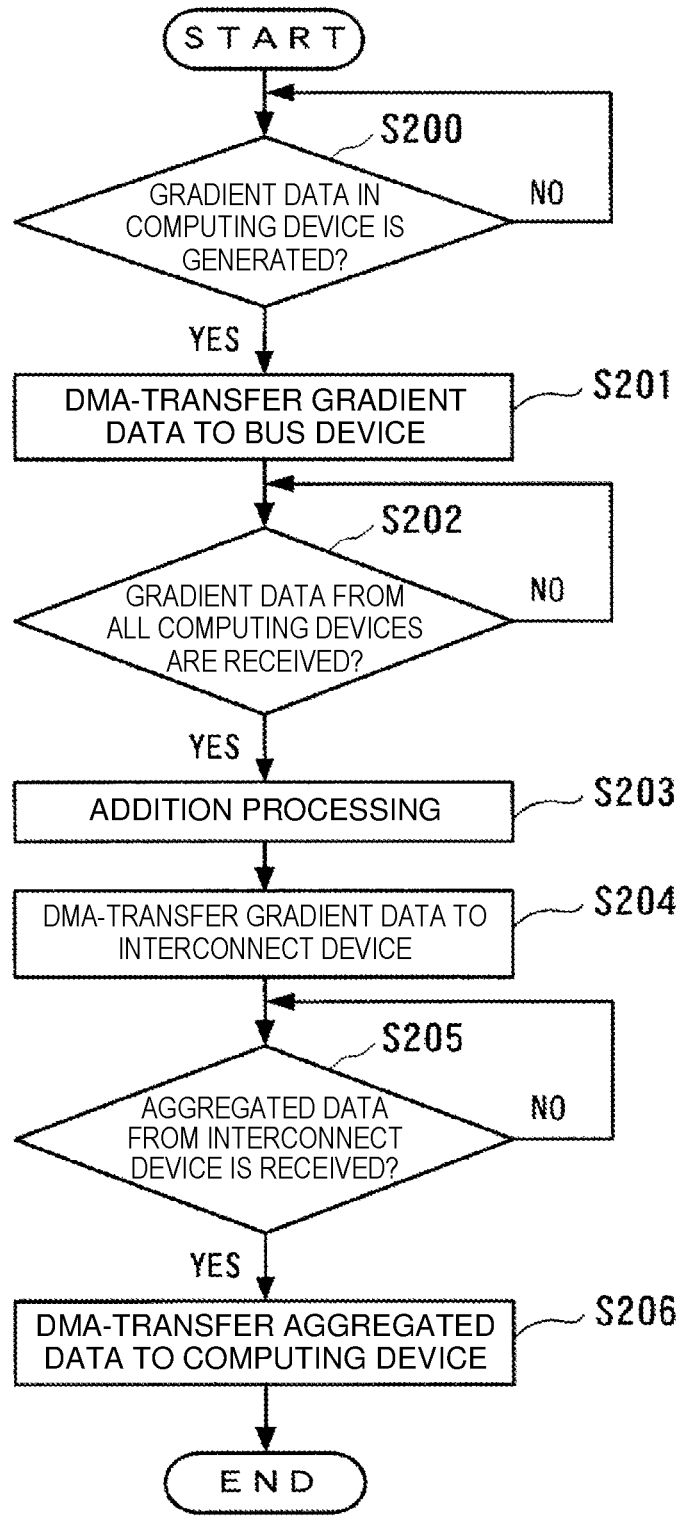
FIG. 3 is a flowchart for explaining the operations of the DMA controller of the distributed processing node according to the first embodiment of the present invention.

FIG. 3 is a flowchart for explaining the operation of the DMA controller 108 of the distributed processing node 102.

When the gradient data is generated by the computing device 103 of each of the distributed processing nodes 102 (step S200 in FIG. 3), the gradient data is DMA-transferred to the computing function unit 106 of the bus device 105 for each of weights (step S201 in FIG. 3).

When gradient data from all the computing devices 103 of the own node are DMA-transferred by the DMA controller 108 of the own node (step S202 in FIG. 3), the computing function unit 106 of the bus device 105 of each of the distributed processing node 102 calculates a sum of the received gradient data for each of the weights (step S203 in FIG. 3).

The DMA controller 108 DMA-transfers the gradient data added up by the computing function unit 106 to the memory 1040 of the interconnect device 104 of the own node (step S204 in FIG. 3).

Figure 10:
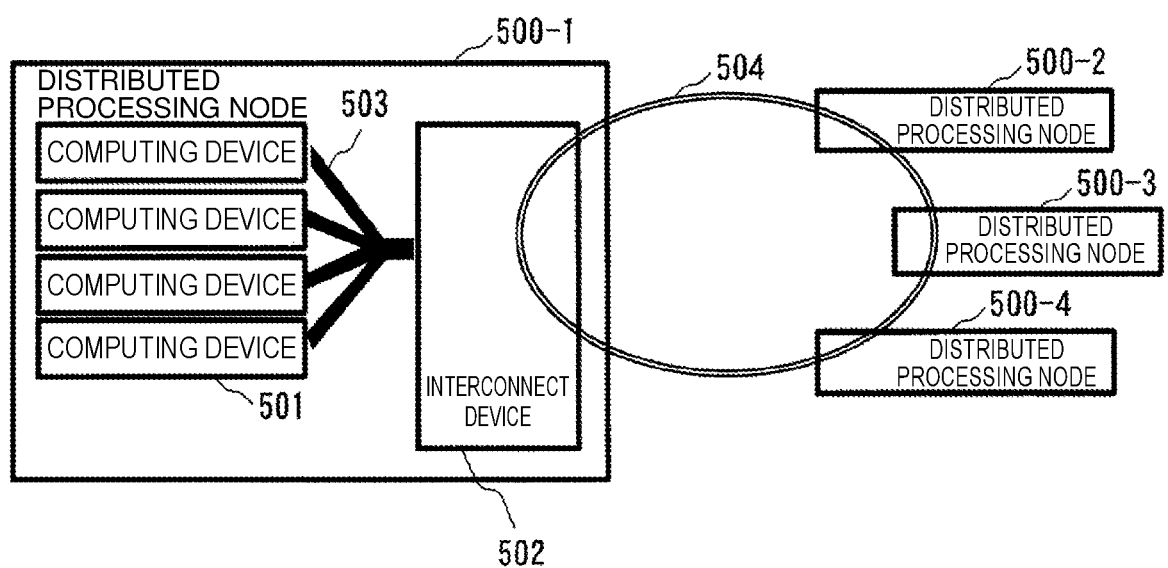
FIG. 10 is a block diagram showing the configuration of a conventional distributed processing system.

In the conventional technique shown in FIG. 10, the gradient data from the computing devices 501 are integrated in the interconnect device 502 (FPGA) and the interconnect device 502 performs the addition processing. When the size of data from the computing devices 501 is 100 MB and an execution band of the bus 503 connecting the computing devices 501 and the interconnect device 502 is 10 GB/s, 10 msec is required for data transfer from one computing device 501 to the interconnect device 502.

Therefore, in the conventional technique, an extra time is required for 30 msec transfer by congestion in the interconnect device 502 compared with data transfer from a single computing device. The extra time is hereinafter referred to as waiting time.

In contrast, according to this embodiment, the gradient data transferred from the four computing devices 103 are integrated in the computing function unit 106 of the bus device 105 and the addition processing is performed. Accordingly, when the gradient data are simultaneously input to the bus device 105 from the four computing devices 103, after the addition processing is performed by the computing function unit 106, a data amount is compressed to a quarter.

Therefore, even when the gradient data subjected to the addition processing is transferred to the interconnect device 104, since congestion in the interconnect device 104 does not occur, a waiting time due to congestion does not occur. For example, if 40 cycles are required for the computing processing in the computing function unit 106 of the bus device 105, a processing time is 80 nsec. The processing time is an extremely short time with respect to the waiting time that occurs conventionally.

Subsequently, the gradient data are further integrated among the distributed processing nodes 102 via the interconnect device 104 and subjected to the addition processing.

Figure 4:
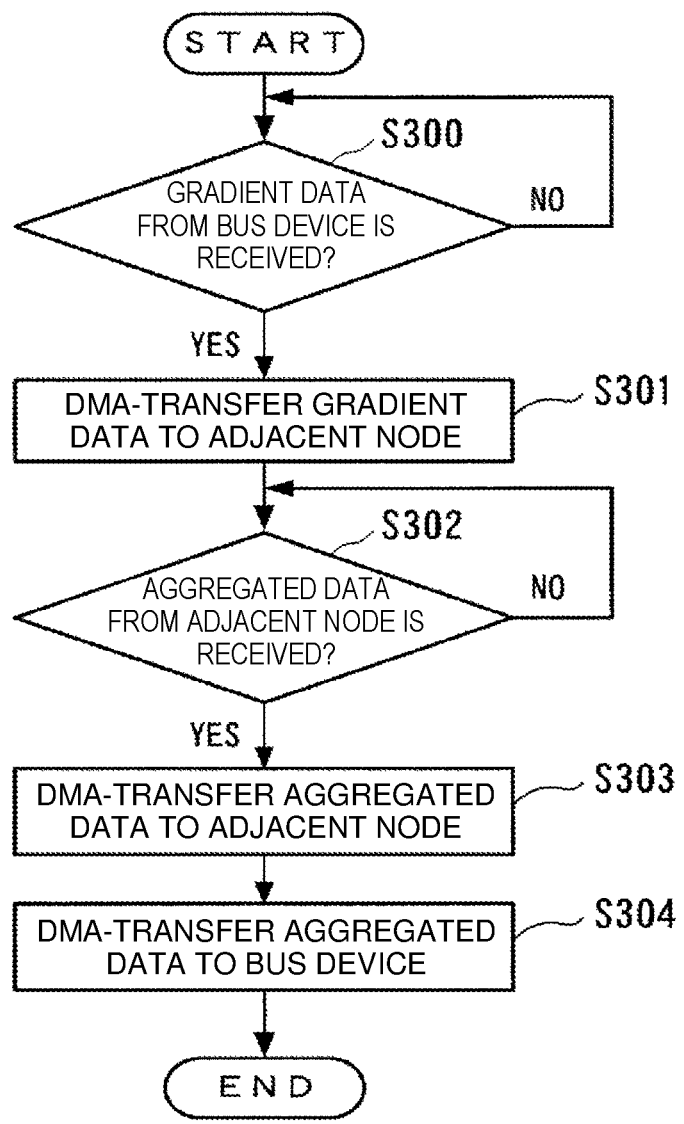
FIG. 4 is a flowchart for explaining the operations of an interconnect device and the DMA controller of the distributed processing node according to the first embodiment of the present invention.
Figure 5:
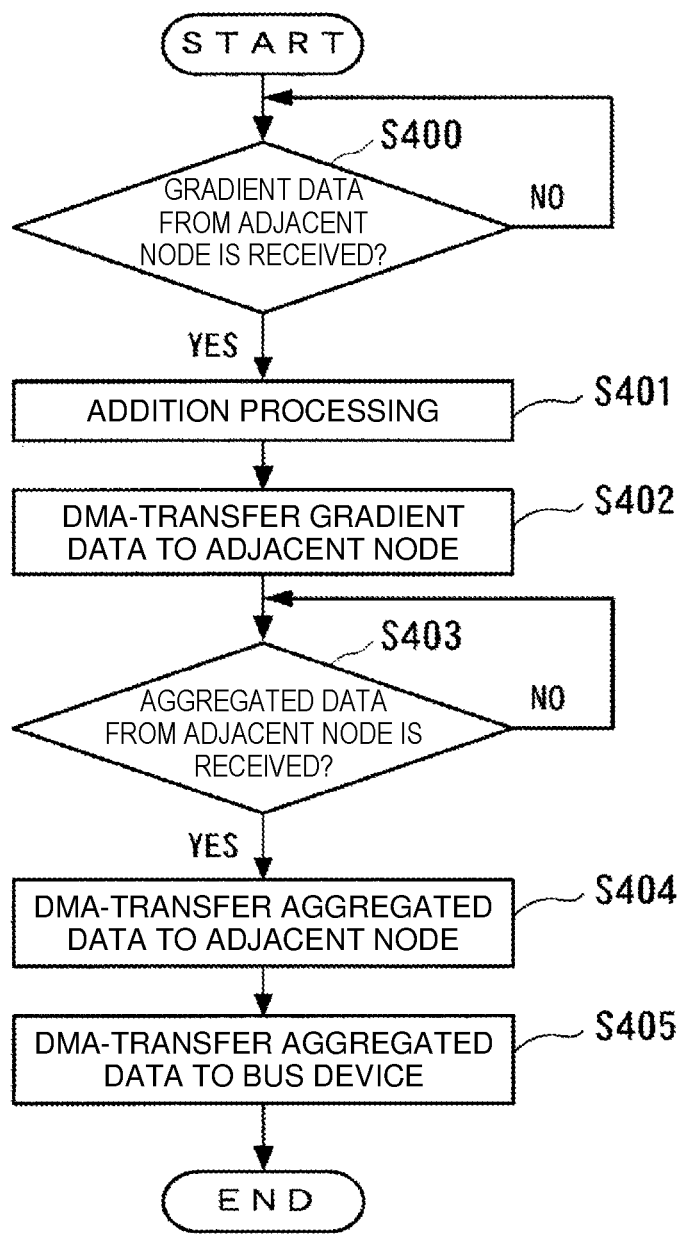
FIG. 5 is a flowchart for explaining the operations of the interconnect device and the DMA controller of the distributed processing node according to the first embodiment of the present invention.

FIG. 4 is a flowchart for explaining the operations of the interconnect device 104 and the DMA controller 108 of a default parent node among the distributed processing nodes 102. FIG. 5 is a flowchart for explaining the operations of the interconnect device 104 and the DMA controller 108 of a child node other than the parent node among the distributed processing nodes 102.

When gradient data is DMA-transferred by the DMA controller 108 of the own node (YES in step S300 in FIG. 4), the interconnect device 104 of the parent node DMA-transfers the gradient data to a child node having the next number (for example, a child node in a clockwise direction) via the transmission line 101A (step S301 in FIG. 4).

When receiving gradient data from an adjacent parent node or child node (for example, a parent node or a child node in a counterclockwise direction) (YES in step S400 in FIG. 5), the interconnect device 104 of the child node calculates, for each of weights, a sum of the received gradient data and the gradient data DMA-transferred by the DMA controller 108 of the own node (step S401 in FIG. 5).

The interconnect device 104 of the child node DMA-transfers the gradient data subjected to the addition processing to a node having the next number (for example, a node in the clockwise direction) via the transmission line 101A (step S402 in FIG. 5).

The processing in steps S400 to S402 in FIG. 5 is performed in order in the child nodes connected in a ring shape by the transmission line 101A, whereby a result obtained by adding up the gradient data of the distributed processing nodes 102 is obtained. The gradient data for which the addition processing in the distributed processing nodes 102 ends is hereinafter referred to as aggregated data.

When receiving aggregated data from an adjacent child node (for example, a child node in the counterclockwise direction) (YES in step S302 in FIG. 4), the interconnect device 104 of the parent node DMA-transfers the received aggregated data to a child node having the next number (for example, a child node in the clockwise direction) (step S303 in FIG. 4).

First, the DMA controller 108 of the parent node DMA-transfers the aggregated data received by the interconnect device 104 of the own node from the adjacent child node to the bus device 105 of the own node with the DMA transfer from the memory 1040 in the interconnect device 104 to the computing device 103 as a trigger (step S304 in FIG. 4).

When receiving aggregated data from an adjacent parent node or child node (for example, a parent node or a child node in the counterclockwise direction) (YES in step S403 in FIG. 5), the interconnect device 104 of the child node DMA-transfers the received aggregated data to a child node having the next number (for example, a child node in the clockwise direction) (step S404 in FIG. 5).

First, the DMA controller 108 of the child node DMA-transfers the aggregated data received by the interconnect device 104 of the own node from the adjacent parent node or child node to the bus device 105 of the own node with the DMA transfer from the memory 1040 to the computing device 103 in the interconnect device 104 to the computing device 103 as a trigger (step S405 in FIG. 5).

In this way, the aggregated data is shared by the distributed processing nodes 102 according to distributed communication.

Subsequently, the DMA controller 108 of each of the distributed processing nodes 102 DMA-transfers aggregated data transferred from the interconnect device 104 to the bus device 105 of the own node to the computing devices 103 of the own node (steps S205 and S206 in FIG. 3).

When the aggregated data is DMA-transferred by the DMA controller 108 of the own node (YES in step S102 in FIG. 2), the computing device 103 performs, based on the aggregated data, weight update processing for updating the weight of a model (a neural network of Resnet50) in the own node (step S103 in FIG. 2). The updated target weight is stored in the parameter storing unit 112.

In the weight update processing, the weight only has to be updated such that a loss function is minimized based on, for example, a gradient of the loss function indicated by the aggregated data. Since the update of the weight is a well-known technique, detailed explanation of the update of the weight is omitted.

One learning ends according to an end of the weight update processing. The distributed processing nodes 102 perform learning using new image data of imagenet. By repeating the learning in this way, inference accuracy of a model is improved.

As explained above, in this embodiment, the gradient data calculated by the plurality of computing devices 103 are integrated in the bus device 105 and computing necessary for group communication is performed. Therefore, a waiting time due to congestion in the interconnect device does not occur. In this embodiment, since it is unnecessary to perform computing by making rounds to the plurality of computing devices, it is possible to suppress variation in processing time. As a result, in this embodiment, it is possible to realize high-speed, low-latency, and stable processing.

In this embodiment, for the addition processing (step S401) in the interconnect device 104 as well, it is possible to use a clock signal of a higher frequency without being restricted by a frequency 195.3125 MHz of a frequency division clock used in a 100G Ethernet®, which is transfer specifications for connecting nodes. It goes without saying that, by using a clock signal having such a high frequency, a time required for addition processing involved in group communication among nodes is reduced and an overall processing time can be further reduced.

One feature of this embodiment is that, by providing, in the distributed processing node 102, the high-speed clock unit 107 that supplies a high-speed clock signal to the computing function unit 106, a computing processing time can be reduced compared with when intra-node addition processing is performed by the interconnect device conventionally.

For example, it is assumed that a bit width processed in one clock is 512 bits in both of the conventional addition processing in the interconnect device and the addition processing in the computing function unit 106 in this embodiment. In the addition processing with 512-bit width, when adders that perform 32-bit floating point addition processing are used, 16 adders are provided in parallel. When the bit width of the conventional addition processing in the interconnect device and the bit width of the addition processing in the computing function unit 106 in this embodiment are the same, a difference is caused in processing speed by a frequency of one clock.

In this embodiment, a frequency of a clock signal supplied from the high-speed clock unit 107 to the computing function unit 106 is 500 MHz and a frequency of a clock signal in the interconnect device 104 is 195.3125 MHz. Therefore, compared with when the intra-node addition processing is performed by the interconnect device, processing speed of the computing function unit 106 is 2.62 times higher. A processing delay due to the intra-node addition processing can be reduced more than when the addition processing is performed by the interconnect device. Such a reduction in the processing delay exerts an effect when the processing speed of the computing function unit 106 of the bus device 105 is equal to or higher than the processing speed of the interconnect device 104.

Subsequently, the DMA transfer between the computing device 103 and the interconnect device 104 is explained in detail. Data needs to be moved at high speed in integrated communication for transferring gradient data in the distributed processing nodes 102 and among the distributed processing nodes 102 and distributed communication for distributing aggregated data to the distributed processing nodes 102.

Accordingly, in the distributed processing node 102, memory regions incorporated in the devices are fixed between the computing device 103 and the bus device 105 and between the bus device 105 and the interconnect device 104. A DMA transfer technique for performing data transfer between fixed memory addresses of the memory regions is used. Similarly, the DMA transfer technique is used among the interconnect devices 104 of the distributed processing nodes 102.

In this embodiment, after computing ends in the computing devices 103, the gradient data DMA-transferred to the bus device 105 are added up and, thereafter, DMA-transferred to the memory 1040 of the interconnect device 104.

In the case of the conventional group communication, four memory regions are necessary because the gradient data is DMA-transferred from the four computing devices respectively to the different memory regions of the interconnect device.

On the other hand, in this embodiment, since the gradient data are added up in the bus device 105 and, thereafter, DMA-transferred to the interconnect device 104, data transfer to three of the four memory regions allocated for the conventional DMA is unnecessary. The memory regions of the interconnect device 104 are wasted.

Therefore, the DMA controller 108 in this embodiment only has to DMA-transfer the gradient data subjected to the addition processing by the bus device 105 to one memory region in the interconnect device 104. In this way, it is unnecessary to provide four memory regions for DMA transfer from the bus device 105 in the interconnect device 104. Efficient use of the memory regions is thus possible. It is possible to achieve further efficiency in the distributed processing system 101 through the efficient use of the memory regions of the interconnect device 104. Such efficiency also exerts an effect when the number of users increases and a plurality of learning jobs are performed in parallel as explained in an embodiment below.

Second Embodiment

Figure 6:
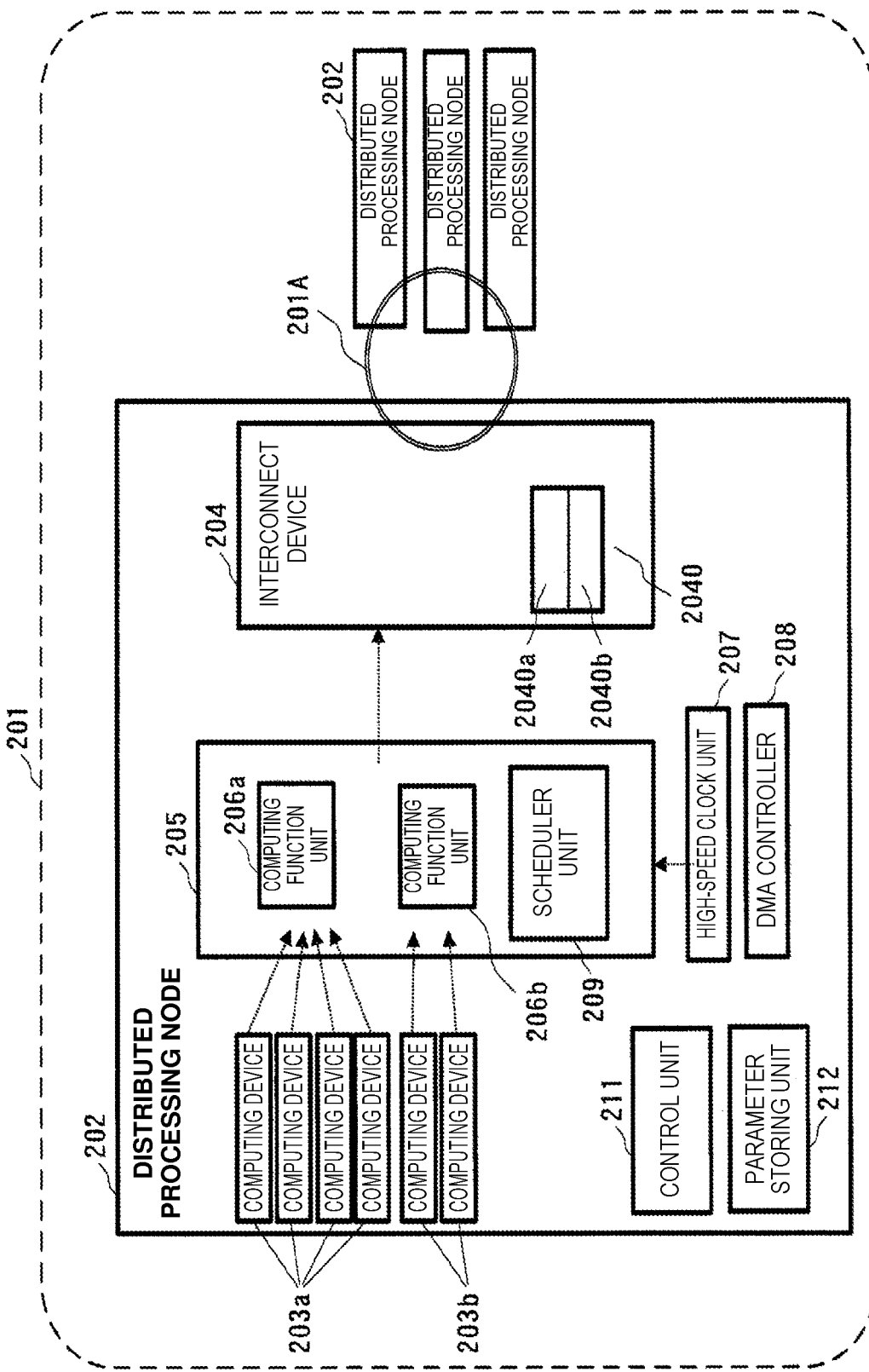
FIG. 6 is a block diagram showing the configuration of a distributed processing system according to a second embodiment of the present invention.

In the following, a second embodiment of the present invention is explained. FIG. 6 is a block diagram showing the configuration of a distributed processing system according to the second embodiment of the present invention. A distributed processing system 201 in this embodiment is configured from a plurality of distributed processing nodes 202 and a transmission line 201A connecting the plurality of distributed processing nodes 202.

Each of the distributed processing nodes 202 includes a plurality of computing devices 203a and 203b, each including a GPU or the like, an interconnect device 204 including an FPGA including a data communication function via a transmission line and an optical transceiver, a bus device 205 including an FPGA including a function of performing data communication with the computing devices 203a and 203b through a general-purpose bus and a computing function, and computing function units 206a and 206b for each of a plurality of learning jobs that are provided in the bus device 205 and process data from the computing devices 203a and 203b and the interconnect device 204.

Each of the distributed processing nodes 202 includes a high-speed clock unit 207 that supplies a high-speed clock signal to the computing function units 206a and 206b, a DMA controller 208 that controls DMA transfer of data between the computing devices 203a and 203b and the bus device 205 and DMA transfer of data between the bus device 205 and the interconnect device 204, a scheduler unit 209 that is provided in the bus device 205 and determines order and timing of DMA transfer from the computing function units 206a and 206b to the interconnect device 204, a control unit 211 that allocates a learning job requested from the outside to at least one of the plurality of computing devices 203a and 203b, and a parameter storing unit 212 that stores parameters of a model.

Differences from the first embodiment include that the plurality of computing devices 203a and the plurality of computing devices 203b perform different learning jobs and that the computing function unit 206a for the computing device 203a, the computing function unit 206b for the computing device 203b, and the scheduler unit 209 are provided in the bus device 205. The four computing devices 203a are fixedly connected to the computing function unit 206a. The two computing devices 203b are fixedly connected to the computing function units 206b.

Subsequently, the operation of the distributed processing system 201 in this embodiment is explained. In this embodiment, a flow of processing of the distributed processing system 201 is the same as the flow of the processing in the first embodiment. Therefore, the flow of the processing is explained using the signs in FIG. 2 to FIG. 5.

In the interconnect device 204, a memory region 2040a for the computing devices 203a and a memory region 2040b for the computing devices 203b are prepared in a memory 2040.

After an end of gradient calculation processing in the computing devices 203a (step S100 in FIG. 2), the DMA controller 208 of each of the distributed processing nodes 202 DMA-transfers gradient data calculated by the computing devices 203a to the memory region 2040a in the interconnect device 204 through the computing function unit 206a of the bus device 205 of the own node (step S101 in FIG. 2).

In the two computing devices 203b, a learning job different from a learning job of the computing devices 203a is performed. Examples of the different learning job include causing a model to learn using different image data and causing a plurality of models to learn using the same image data.

After an end of gradient calculation processing in the computing devices 203b, the DMA controller 208 DMA-transfers gradient data calculated by the computing devices 203b to the memory region 2040b in the interconnect device 204 through the computing function unit 206b of the bus device 205 of the own node (step S101).

When the gradient data are DMA-transferred by the DMA controller 208, the computing function unit 206a of the bus device 205 of each of the distributed processing nodes 202 calculates a sum of the received gradient data for each of weights (step S203 in FIG. 3). Similarly, when the gradient data are DMA-transferred by the DMA controller 208, the computing function unit 206b calculates a sum of the received gradient data for each of weights (step S203).

The DMA controller 208 of each of the distributed processing nodes 202 DMA-transfers the gradient data added up by the computing function unit 206a of the own node to the memory region 2040a of the interconnect device 204 of the own node (step S204 in FIG. 3). Similarly, the DMA controller 208 DMA-transfers the gradient data added up by the computing function unit 206b of the own node to the memory region 2040b of the interconnect device 204 of the own node (step S204).

In this embodiment, when such DMA transfer in step S204 is carried out, the scheduler unit 209 controls at which timing gradient data subjected to addition processing by which computing function unit is transferred to the interconnect device 204.

In the following explanation, after an end of the gradient calculation processing in the four computing devices 203a, the gradient calculation processing in the two computing devices 203b ends.

The scheduler unit 209 in the bus device 205 acquires, from the DMA controller 208, information concerning the DMA transfer from the computing device 203a or 203b to the computing function unit 206a or 206b of the bus device 205 and stores the information. The information concerning the DMA transfer includes a size of DMA-transferred data, timing information of the DMA transfer, and an ID (identification) of a learning job of the computing device 203a or 203b.

The scheduler unit 209 stores the information concerning the DMA transfer for each of IDs of learning jobs (for each of the computing function units). The scheduler unit 209 stores a time required for processing at each of the computing function units 206a and 206b.

The scheduler unit 209 determines, based on the information concerning the DMA transfer and information concerning processing times at the computing function units 206a and 206b, from which of the computing function units 206a and 206b the gradient data is transferred to the interconnect device 204 earlier.

For example, suppose it is expected that gradient data from the four computing devices 203a reach the computing function unit 206a earlier and the addition processing is started but a processing time is long and processing ends earlier in the computing function unit 206b that processes gradient data from the two computing devices 203b. In this case, the scheduler unit 209 notifies the DMA controller 208 that the gradient data subjected to the addition processing by the computing function unit 206b is transferred to the interconnect device 204 earlier than the gradient data subjected to the addition processing by the computing function unit 206a.

In this way, in this embodiment, it is possible to avoid a situation in which the DMA transfer of the gradient data stops halfway. Sure DMA transfer by the DMA controller 208 is possible. Therefore, in this embodiment, it is possible to efficiently and stably process a plurality of learning jobs.

The operations of the computing function units 206a and 206b and the interconnect device 204 are the same as the operations of the computing function unit 106 and the interconnect device 104 in the first embodiment. The IDs of the learning jobs are added to the gradient data generated by the computing devices 203a and 203b. Therefore, the computing function units 206a and 206b and the interconnect device 204 can perform, for each of the learning jobs, the processing explained in the first embodiment.

Note that the scheduler unit 209 may determine not the computing function unit expected to end the addition processing earlier but DMA transfer order of the computing function units for each of the learning jobs based on information concerning priority order decided for types of the learning jobs in advance.

Third Embodiment

Figure 7:
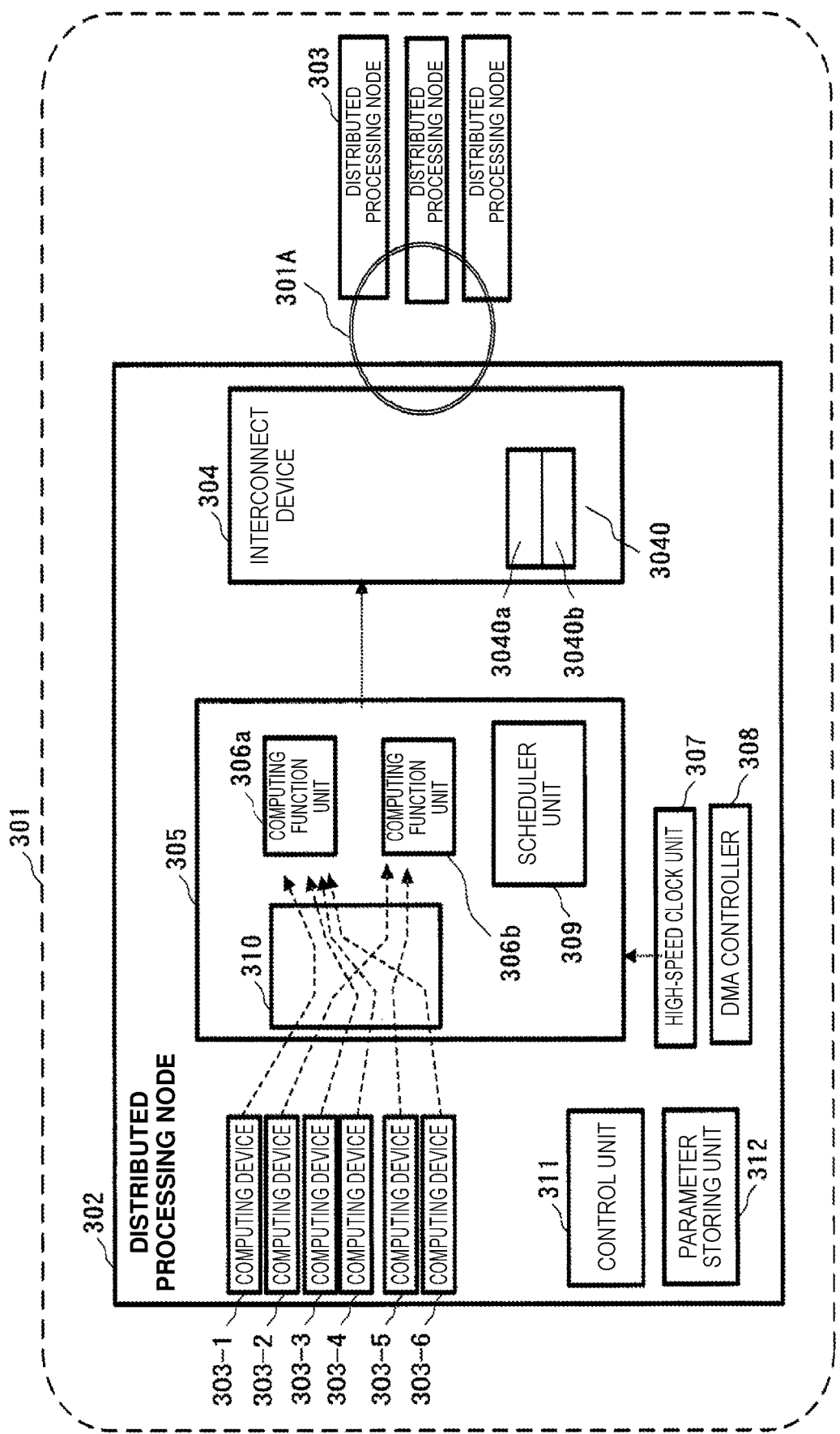
FIG. 7 is a block diagram showing the configuration of a distributed processing system according to a third embodiment of the present invention.

In the following, a third embodiment of the present invention is explained. FIG. 7 is a block diagram showing the configuration of a distributed processing system according to the third embodiment of the present invention. A distributed processing system 301 in this embodiment is configured from a plurality of distributed processing nodes 302 and a transmission line 301A connecting the plurality of distributed processing nodes 302.

Each of the distributed processing nodes 302 includes a plurality of computing devices 303-1 to 303-6 including GPUs or the like, an interconnect device 304 including an FPGA including a data communication function via a transmission line and an optical transceiver, a bus device 305 including an FPGA including a function of performing data communication with the computing devices 303-1 to 303-6 through a general-purpose bus and a computing function, and a plurality of computing function units 306a and 306b that are provided in the bus device 305 and process data from the computing devices 303-1 to 303-6 and the interconnect device 304.

Each of the distributed processing nodes 302 includes a high-speed clock unit 307 that supplies a high-speed clock signal to the computing function units 306a and 306b, a DMA controller 308 that controls DMA transfer of data between the computing devices 303-1 to 303-6 and the bus device 305 and DMA transfer of data between the bus device 305 and the interconnect device 304, and a scheduler unit 309 that is provided in the bus device 305 and determines order and timing of the DMA transfer from the computing function units 306a and 306b to the interconnect device 304.

Further, each of the distributed processing nodes 302 includes a sorting unit 310 that is provided in the bus device 305 and sorts, to the computing function units 306a and 306b corresponding to the learning jobs, gradient data calculated by the computing devices 303-1 to 303-6 in response to a request for learning jobs and transferred to the bus device 305, a control unit 311 that allocates a learning job requested from the outside to at least one of the plurality of computing devices 303-1 to 303-6, and a parameter storing unit 312 that stores parameters of a model.

In the interconnect device 304, a memory region 2040a for a computing device 303a and a memory region 2040b for a computing device 303b are prepared in a memory 3040.

Differences from the second embodiment are that allocation of learning jobs to the computing devices 303-1 to 303-6 is not fixed and that the sorting unit 310 that sorts gradient data from the computing devices 303-1 to 303-6 to the computing function unit 206a or 206b corresponding to a learning job of a computing device at a transfer source is provided in the bus device 305.

Subsequently, the operation of the distributed processing system 301 in this embodiment is explained. In the following explanation, different learning jobs are executed in the same period in the distributed processing nodes 302 and information processing such as distributed deep learning is performed among the distributed processing nodes 302. In this embodiment, a flow of processing of the distributed processing system 301 is the same as the flow of the processing in the first embodiment. Therefore, the flow of the processing is explained using the signs in FIG. 2 to FIG. 5.

For example, at a stage when a request for a learning job is received from a new user, the control unit 311 of the distributed processing node 302 searches for free resources, that is, the computing devices 303-1 to 303-6 to which a learning job is not allocated.

In an example shown in FIG. 7, it is assumed that a learning job (hereinafter, learning job "a") has already been performed in the computing devices 303-1, 303-3, 303-4, and 303-6 among the six computing devices 303-1 to 303-6. Therefore, the computing devices 303-2 and 303-5 are free resources. Accordingly, the control unit 311 allocates a new learning job (hereinafter, learning job "b") to the computing devices 303-2 and 303-5.

In this embodiment, it is assumed that a computing function necessary for group communication in the learning job "a" (an addition processing function for gradient data from the four computing devices) is implemented in the computing function unit 306a and a computing function necessary for group communication in the learning job "b" (an addition processing function for gradient data from the two computing devices) is implemented in the computing function unit 306b.

After an end of gradient calculation processing in the computing devices 303-1 to 303-6 of the own node, the DMA controller 308 of each of the distributed processing nodes 302 DMA-transfers gradient data calculated by the computing devices 303-1 to 303-6 to the memory 304*d* in the interconnect device 304 through the bus device 305 of the own node (step S101 in FIG. 2).

At this time, the sorting unit 310 acquires, from the DMA controller 308, information concerning DMA transfer from the computing devices 303-1 to 303-6 to the bus device 305. The information concerning the DMA transfer includes a size of DMA-transferred data, timing information of the DMA transfer, an ID of a learning job of the computing devices 303-1 to 303-6, and an ID of a bus used for the DMA transfer.

The sorting unit 310 sorts, to the computing function unit 306*a* or 306*b*, gradient data calculated by the computing devices 303-1 to 303-6 based on the information acquired from the DMA controller 308.

Specifically, the sorting unit 310 sorts, to the computing function unit 306*a* corresponding to the learning job "a", gradient data calculated by the computing devices 303-1, 303-3, 303-4, and 303-6 that perform the learning job "a". The sorting unit 310 sorts, to the computing function unit 306*b* corresponding to the learning job "b", gradient data calculated by the computing devices 303-2 and 303-5 that perform the learning job "b".

In this embodiment, by performing the sorting of the gradient data with the sorting unit 310, when a plurality of users, that is, a plurality of learning jobs share a distributed processing system, gradient data by different learning jobs are not mixed even when variation occurs depending on the number of learning jobs or a necessary resource amount. Therefore, it is possible to efficiently and stably process the plurality of learning jobs. By performing such sorting, when a plurality of users, that is, a plurality of learning jobs share a distributed processing system, gradient data by different learning jobs are not mixed even when a resource amount necessary for a learning job is different depending on the learning job. Therefore, it is possible to efficiently and stably process a plurality of learning jobs.

The operations of the computing function units 306*a* and 306*b*, the scheduler unit 309, and the interconnect device 304 are the same as the operations of the computing function units 206*a* and 206*b*, the scheduler unit 209, and the interconnect device 204 in the second embodiment.

Note that, in the explanation in the second and third embodiments, as an example, the six computing devices and the two computing function units are provided. However, the numbers of computing devices and computing function units are not limited to those in the second and third embodiments.

As a computing function implemented in the computing function units 106, 206*a*, 206*b*, 306*a*, and 306*b* in the first to third embodiments, a computing function necessary for group communication processing called Allreduce is assumed.

However, depending on an application, the computing function may be a computing function necessary for processing called "reduce" for integrating gradient data or a computing function necessary for processing called "allgather" for distributing a result to all nodes. The computing function implemented in the computing function units 106, 206*a*, 206*b*, 306*a*, and 306*b* may not be the computing function necessary for group communication. The computing function units 106, 206*a*, 206*b*, 306*a*, and 306*b* may be divided into a plurality of units for each of functions.

The bus devices 105, 205, and 305 including the computing function units 106, 206*a*, 206*b*, 306*a*, and 306*b* may not be singular and may be plural, that is, may be respectively mounted with respect to a plurality of general-purpose buses. A plurality of bus devices may be respectively connected to independent interconnect devices.

Note that, in the first to third embodiments, a connection configuration of the computing devices 103, 203*a*, 203*b*, and 303-1 to 303-6, the computing function units 106, 206*a*, 206*b*, 306*a*, and 306*b*, and the interconnect devices 104, 204, and 304 is a hierarchical type. However, there is no restriction that the number of computing devices is equal to or larger than the number of computing function units or that the number of computing function units is equal to or larger than the number of interconnect devices.

For example, when gradient data from the four computing devices are distributed by the computing function units, implementation having four computing devices, one computing function unit, and four interconnect devices is also possible.

Note that, in the first to third embodiments, the transfer in the direction from the computing devices 103, 203*a*, 203*b*, and 303-1 to 303-6 to the interconnect devices 104, 204, and 304 is explained. However, the same function may be present in the opposite direction.

For example, when the computing devices in each of the distributed processing nodes share aggregated data added up among the distributed processing nodes, if a copy function is included as a function of the computing function units, the aggregated data copied by the computing function units can be DMA-transferred to a fixed memory region of a designated computing device based on information concerning the computing device at a transfer destination acquired from the DMA controller. Consequently, it is possible to realize the function in the opposite direction. The copy function may be included in the sorting unit rather than the computing function units.

Fourth Embodiment

Figure 8:
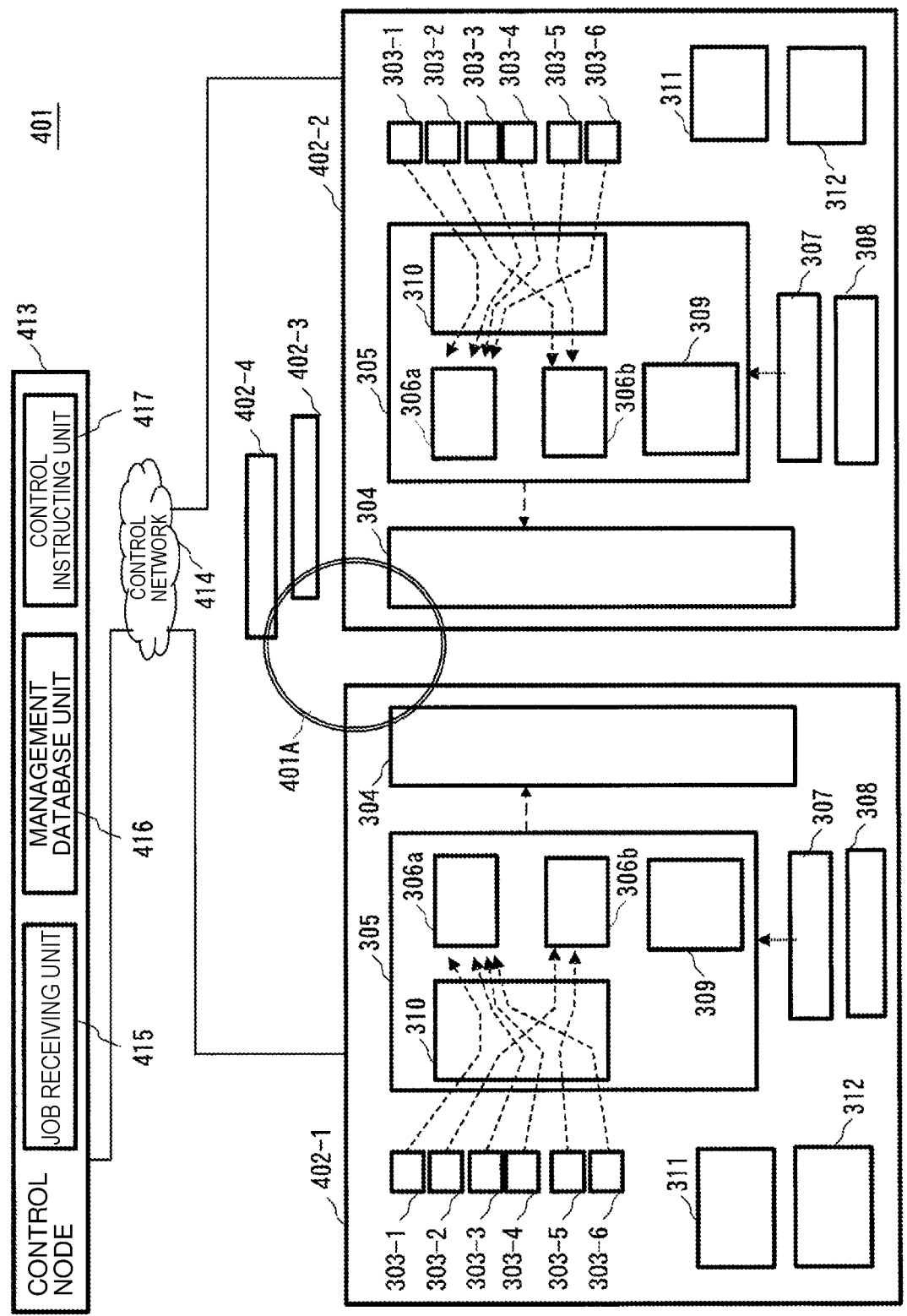
FIG. 8 is a block diagram showing the configuration of a distributed processing system according to a fourth embodiment of the present invention.

In the following, a fourth embodiment of the present invention is explained. FIG. 8 is a block diagram showing the configuration of a distributed processing system according to a fourth embodiment of the present invention. A distributed processing system 401 in this embodiment is configured from a plurality of distributed processing nodes 402-1 to 402-4, a transmission line 401A connecting the plurality of distributed processing nodes 402-1 to 402-4, a control node 413 that controls the distributed processing nodes 402-1 to 402-4, and a control network 414 connecting the control node 413 and the distributed processing nodes 402-1 to 402-4.

Each of the distributed processing nodes 402-1 to 402-4 includes the plurality of processing devices 303-1 to 303-6, the bus device 305, the plurality of computing function units 306*a* and 306*b* provided in the bus device 305, the high-speed clock unit 307, the DMA controller 308, the scheduler unit 309, the sorting unit 310, the control unit 311, and the parameter storing unit 312.

Differences from the first to third embodiments include that the distributed processing nodes 402-1 to 402-4 are set in different buildings, for example, the distributed processing node 402-1 is set in a building A, the distributed processing node 402-2 is set in a building B, the distributed processing node 402-3 is set in a building C, and the distributed processing node 402-4 is set in a building D and that the control node 413 is provided for synchronization of processing timings in the distributed processing nodes 402-1 to 402-4, management of the entire system, and the like.

The operation in this embodiment is explained based on the configuration explained above with reference to learning processing in distributed deep learning as an example. As in the third embodiment, it is assumed that, in the distributed processing node 402-1 set in the building A, the learning job "a" has already been performed in the computing devices 303-1, 303-3, 303-4, and 303-6 among the six computing devices 303-1 to 303-6. Execution of the new learning job "b" in this state is explained.

In the configuration of the third embodiment, a state of another distributed processing node, for example, the distributed processing node 402-2 set in the building B is unknown from the distributed processing node 402-1. Accordingly, in this embodiment, the control node 413 connected to the distributed processing nodes 402-1 to 402-4 is provided.

The control node 413 includes a job receiving unit 415 that receives a request for a learning job from a user, a management database unit 416 that retains and manages resource information of each of the distributed processing nodes 402-1 to 402-4, information concerning a model, information concerning learning data, and the like, and a control instructing unit 417 that gives instructions to the distributed processing nodes 402-1 to 402-4.

Request information for the new learning job "b" from the user is received by the job receiving unit 415 of the control node 413. The request information includes information concerning a learning target model and information such as a computing data type and a requested resource amount.

The control instructing unit 417 creates control instruction information to the distributed processing nodes 402-1 to 402-4 based on the request information from the job receiving unit 415 and the information managed by the management database unit 416. The control instruction information includes information concerning a learning target model, data necessary for computing, information concerning parameters of a model, and information concerning a computing device to which a learning job is allocated.

When receiving the control instruction information from the control instructing unit 417 of the control node 413 via the control network 414, the control unit 311 of each of the distributed processing nodes 402-1 to 402-4 secures resources based on the control instruction information. That is, the control unit 311 allocates a learning job to the computing device 303 of the own node instructed by the control instruction information.

Beside securing the resources, the control unit 311 performs preparation such as readout of parameters of a learning target model and readout of learning data. By reading out the parameters of the learning target model from the parameter storing unit 312 in this way, it is possible to cause the computing device 303 to start a learning job.

In the example explained above, the learning job "a" has already been performed in the computing devices 303-1, 303-3, 303-4, and 303-6 among the six computing devices 303-1 to 303-6 of the distributed processing node 402-1 set in the building A.

Therefore, the control instructing unit 417 of the control node 413 determines to allocate the learning job "b" to the computing devices 303-2 and 303-5 to which the learning job "a" is not allocated among the six computing devices 303-1 to 303-6 of the distributed processing node 402-1 and the computing devices 303-3, 303-4, and 303-5 to which the learning job "a" is not allocated among the six computing devices 303-1 to 303-6 of the distributed processing nodes 402-2.

The control unit 311 of the distributed processing node 402-1 allocates the learning job "b" to the computing devices 303-2 and 303-5 of the own node instructed by the control instruction information from the control instructing unit 417 of the control node 413. Similarly, the control unit 311 of the distributed processing node 402-2 allocates the learning job "b" to the computing devices 303-3, 303-4, and 303-5 of the own node instructed by the control instruction information.

The operations of the computing function units 306*a* and 306*b*, the scheduler unit 309, the sorting unit 310, and the interconnect device 304 are the same as the operations in the third embodiment. An ID of a learning job is added to gradient data generated by the computing devices 301-1 to 303-6 of each of the distributed processing nodes 402-1 to 402-4.

Therefore, the computing function units 306*a* and 306*b*, the scheduler unit 309, the sorting unit 310, and the interconnect device 304 can perform the processing explained in the first to third embodiments for each learning job. In this way, distributed processing for the learning job "b" is performed separately from the distributed processing for the learning job "a".

When the distributed processing for the learning job "a" ends, a result of update processing, that is, updated parameters of a model are written in the parameter storing unit 312 and information indicating that the learning job "a" is completed is sent from the control unit 311 to the management database unit 416 of the control node 413.

Similarly, when the distributed processing for the learning job "b" ends, a result of update processing is written in the parameter storing unit 312 and information indicating that the learning job "b" is completed is sent from the control unit 311 to the management database unit 416 of the control node 413. In this way, the distributed processing system 401 comes into a standby state for the next new learning job.

As explained above, in this embodiment, the distributed processing nodes 402-1 to 402-4 perform the distributed processing according to the instruction from the control node 413. Therefore, it is possible to efficiently perform the distributed processing among the distributed processing nodes 402-1 to 402-4 present in geographically remote buildings.

By providing the parameter storing unit 312 in each of the distributed processing nodes 402-1 to 402-4, for example, when a request is generated for a learning job performed using learning data such as sensor information generated in a burst-like manner in an area where the distributed processing node is set, a result obtained by performing learning of a model can be stored in the parameter storing unit 312. Therefore, when a request for a learning job that should be processed is generated again, parameters obtained in the last learning job can be obtained from the parameter storing unit 312. It is possible to learn a model using the parameters.

In this embodiment, the configuration of the distributed processing node in the third embodiment is used as the configuration of the distributed processing nodes 402-1 to 402-4. However, it goes without saying that the configurations of the distributed processing nodes in the first and second embodiments may be used, too.

In the first to fourth embodiments, as an example of the computing devices 103, 203*a*, 203*b*, and 303-1 to 303-6, the GPU is explained as an example. However, not only this, but a CPU, an FPGA, a quantum computing device, an artificial intelligence (neuron) chip, or the like may be used as the computing devices 103, 203a, 203b, and 303-1 to 303-6.

Note that the fixing concerning the DMA transfer in a sentence described above is concerning a memory to which the DMA transfer is performed and means that swap-out of the memory is prevented by setting. Accordingly, a fixed memory means that the user can monopolize a specific region of the memory when using the memory. Depending on setting, the user can share a memory region with other users and change the memory region to a memory region for DMA of other users. The fixing concerning the DMA transfer does not mean that a specific memory region is fixed in advance and cannot be changed.

Figure 9:
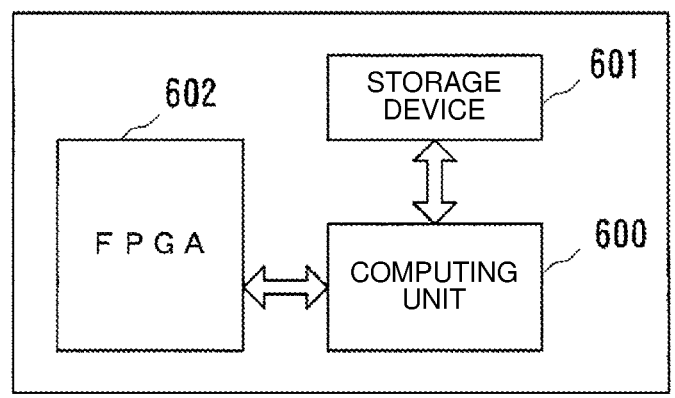
FIG. 9 is a block diagram showing a configuration example of a computer that realizes the distributed processing nodes according to the first to fourth embodiments of the present invention.

Each of the distributed processing nodes explained in the first to fourth embodiments can be realized by a computer including a computing unit such as a CPU or a GPU, a storage device, and an interface, a program for controlling these hardware resources, and an FPGA. A configuration example of the computer is shown in FIG. 9. The computer includes a computing unit 600, a storage device 601, and an FPGA 602. The computing unit 600 such as a CPU or a GPU of each of the distributed processing nodes executes, according to a program stored in the storage device 601 of each of the distributed processing nodes, the processing explained in the first to fourth embodiments. Similarly, the control node 413 can be realized by a computer.

INDUSTRIAL APPLICABILITY

Embodiments of the present invention can be applied to a distributed processing system that executes deep learning in a plurality of nodes in a distributed cooperated manner.

REFERENCE SIGNS LIST 101, 201, 301, 401 Distributed processing system
101A, 201A, 301A, 401A Transmission line
102, 202, 302, 402-1 to 402-4 Distributed processing node
103, 203a, 203b, 303-1 to 303-6 Computing device
104, 204, 304 Interconnect device
105, 205, 305 Bus device
106, 206a, 206b, 306a, 306b Computing function unit
107, 207, 307 High-speed clock unit
108, 208, 308 DMA controller
111, 211, 311 Control unit
112, 212, 312 Parameter storing unit
209, 309 Scheduler unit
310 Sorting unit
413 Control node
414 Control network
415 Job receiving unit
416 Management database unit
417 Control instructing unit
1040, 2040, 3040 Memory

The invention claimed is:

1. A distributed processing node comprising:
a plurality of computing devices configured to calculate gradient data of a loss function from an output result obtained by inputting learning data to a learning target model and update parameters of the learning target model based on aggregation data of the gradient data;
an interconnect device configured to aggregate the gradient data between the distributed processing node and other distributed processing nodes;
a computing function device provided in a bus device connected to the plurality of computing devices and the interconnect device, the computing function device being configured to perform processing of the gradient data from the plurality of computing devices or processing of the gradient data from the interconnect device;
a DMA controller configured to control a DMA transfer of the gradient data between the plurality of computing devices and the bus device and the DMA transfer of the gradient data between the bus device and the interconnect device; and
a controller configured to allocate a learning job requested from an outside to at least one of the plurality of computing devices.

2. The distributed processing node according to claim 1, wherein the computing function device is provided for each learning job.

3. The distributed processing node according to claim 2, further comprising a sorting unit configured to acquire, from the DMA controller, information concerning the DMA transfer from the plurality of computing devices to the bus device and sort the gradient data calculated by the computing devices in response to a request for the learning job and transferred from the bus device to the computing function device corresponding to the learning job based on the information acquired from the DMA controller.

4. The distributed processing node according to claim 2, further comprising a scheduler configured to acquire, from the DMA controller, information concerning the DMA transfer from the plurality of computing devices to the bus device and determine, based on the acquired information, an order and timing of the DMA transfer from the computing function device in the bus device to the interconnect device.

5. The distributed processing node according to claim 1, wherein:
a frequency of a clock signal supplied to the computing function device is higher than the frequency of the clock signal supplied to the interconnect device; and
an operation speed of the computing function device is higher than the operation speed of the interconnect device.

6. A distributed processing system comprising:
a plurality of distributed processing nodes, each of the distributed processing nodes comprising:
a plurality of computing devices configured to calculate gradient data of a loss function from an output result obtained by inputting learning data to a learning target model and update parameters of the learning model based on aggregation data of the gradient data;
an interconnect device configured to aggregate the gradient data between the distributed processing node and other distributed processing nodes;
a computing function device provided in a bus device connected to the plurality of computing devices and the interconnect device, the computing function device being configured to perform processing of the gradient data from the plurality of computing devices or processing of the gradient data from the interconnect device;
a DMA controller configured to control a DMA transfer of the gradient data between the plurality of computing devices and the bus device and the DMA transfer of the gradient data between the bus device and the interconnect device; and
a controller configured to allocate a learning job requested from an outside to at least one of the plurality of computing devices; and a control node configured to control the plurality of distributed processing nodes, wherein the control node comprises:
   a job receiving device configured to receive request information of the learning job from the outside;
   a management database device configured to manage resource information of each of the distributed processing nodes; and
   a control instructing device configured to create, based on the request information from the job receiving device and the resource information managed by the management database device, for each of the distributed processing nodes, control instruction information including information concerning the computing device to which the learning job is allocated, wherein the controller of each of the distributed processing nodes is configured to allocate the learning job to the computing device of the own node instructed by the control instruction information and cause the computing device to start the learning job.

7. The distributed processing system according to claim 6, wherein:
   each of the distributed processing nodes further comprises a parameter storing device configured to store parameters of the learning target model;
   the management database device of the control node is configured to manage the resource information of each of the distributed processing nodes and information concerning the learning target model;
   the control instructing device of the control node is configured to create, besides the information concerning the computing device to which the learning job is allocated, the control instruction information including the information concerning the learning target model and information concerning parameters; and
   the controllers of each of the distributed processing nodes are configured to read out the parameters of the learning target model from the parameter storing device of the own node according to the control instruction information.

8. The distributed processing system according to claim 6, wherein the computing function device is provided for each learning job.

9. The distributed processing system according to claim 8, wherein each of the distributed processing nodes further comprises a sorting unit configured to acquire, from the DMA controller, information concerning the DMA transfer from the plurality of computing devices to the bus device and sort the gradient data calculated by the computing devices in response to a request for the learning job and transferred from the bus device to the computing function device corresponding to the learning job based on the information acquired from the DMA controller.

10. The distributed processing system according to claim 8, wherein each of the distributed processing nodes further comprises a scheduler configured to acquire, from the DMA controller, information concerning the DMA transfer from the plurality of computing devices to the bus device and determine, based on the acquired information, an order and timing of the DMA transfer from the computing function device in the bus device to the interconnect device.

11. The distributed processing system according to claim 6, wherein:
   a frequency of a clock signal supplied to the computing function device is higher than the frequency of the clock signal supplied to the interconnect device; and
   an operation speed of the computing function device is higher than the operation speed of the interconnect device.

* * * * *